United States Patent
Lee et al.

(10) Patent No.: US 10,018,869 B2
(45) Date of Patent: Jul. 10, 2018

(54) TOUCH SENSOR-INTEGRATED DISPLAY DEVICE

(71) Applicant: LG Display Co., Ltd., Seoul (KR)

(72) Inventors: Deuksu Lee, Gyeonggi-do (KR); Jihyun Jung, Gyeonggi-do (KR); Taeyun Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/569,962

(22) Filed: Dec. 15, 2014

(65) Prior Publication Data

US 2015/0331529 A1  Nov. 19, 2015

(30) Foreign Application Priority Data

May 19, 2014 (KR) .................. 10-2014-0059866

(51) Int. Cl.
| | |
|---|---|
| *G06F 3/041* | (2006.01) |
| *G02F 1/1335* | (2006.01) |
| *G09G 3/36* | (2006.01) |
| *G02F 1/1333* | (2006.01) |
| *G06F 3/044* | (2006.01) |

(52) U.S. Cl.
CPC .... *G02F 1/133512* (2013.01); *G02F 1/13338* (2013.01); *G06F 3/044* (2013.01); *G06F 3/0412* (2013.01); *G09G 3/3648* (2013.01)

(58) Field of Classification Search
CPC ....... G06F 3/0412; G06F 3/044; G06F 3/3648
USPC .......................................................... 345/173
See application file for complete search history.

(56) References Cited

U.S. PATENT DOCUMENTS

| | | | |
|---|---|---|---|
| 2009/0102814 A1* | 4/2009 | Lin | G06F 3/044 345/174 |
| 2011/0242444 A1 | 10/2011 | Song | |
| 2012/0105337 A1* | 5/2012 | Jun | G06F 3/0412 345/173 |
| 2012/0218199 A1 | 8/2012 | Kim et al. | |
| 2012/0218482 A1 | 8/2012 | Hwang et al. | |
| 2014/0092326 A1 | 4/2014 | Zhou et al. | |

(Continued)

FOREIGN PATENT DOCUMENTS

| | | |
|---|---|---|
| CN | 101881899 A | 11/2010 |
| CN | 102207644 A | 10/2011 |

(Continued)

OTHER PUBLICATIONS

Taiwanese Office Action dated Oct. 13, 2015, for corresponding Patent Application No. 103139424.

(Continued)

*Primary Examiner* — Long D Pham
(74) *Attorney, Agent, or Firm* — Morgan, Lewis & Bockius LLP

(57) ABSTRACT

A touch sensor-integrated display device is provided which does not suffer from a reduction in aperture ratio. The touch sensor-integrated display device includes first and second substrates, color filters that are defined by a black matrix in the active area of the second substrate and arranged in a first direction and a second direction crossing the first direction, touch electrodes that are arranged in the first and second directions so as to overlap the color filters, and a plurality of routing wires that are arranged on the black matrix and are respectively connected to the touch electrodes and extend to the bezel area.

13 Claims, 5 Drawing Sheets

(56) References Cited

U.S. PATENT DOCUMENTS

2014/0168138 A1* 6/2014 Kuo ................. G06F 3/0412
                                                    345/174
2014/0362031 A1   12/2014 Mo et al.
2016/0018922 A1*  1/2016 Wang ................ G06F 3/0412
                                                    345/174

FOREIGN PATENT DOCUMENTS

| | | | |
|---|---|---|---|
| CN | 102466907 | A | 5/2012 |
| CN | 102929465 | A | 2/2013 |
| CN | 103279245 | A | 9/2013 |
| CN | 103677465 | A | 3/2014 |
| CN | 103793120 | A | 5/2014 |
| KR | 20110108886 | A | 10/2011 |
| KR | 20120037610 | A | 4/2012 |
| TW | 201235756 | A | 9/2012 |
| TW | 201236127 | A | 9/2012 |

OTHER PUBLICATIONS

Korean Office Action dated Apr. 18, 2016 in in counterpart Korean Patent Application No. 10-2014-0059866.
First Notification of Office Action dated Jul. 4, 2017 from The State Intellectual Property Office of China in related Chinese patent application No. 201410815176.2.
Second Notification of Office Action dated Mar. 22, 2018 from The State Intellectual Property Office of China in related Chinese patent application No. 201410815176.2.

* cited by examiner

TOUCH SENSOR-INTEGRATED DISPLAY DEVICE

This application claims the benefit of priority under 35 U.S.C. § 119(a) to Korean Patent Application No. 10-2014-0059866 filed on May 19, 2014, which is incorporated herein by reference for all purposes as if fully asset forth herein.

BACKGROUND OF THE INVENTION

Field of the Invention

The present disclosure relates to a touch sensor-integrated display device, and more particularly, to a touch sensor-integrated liquid crystal display device which is suitable as a display device driven by a vertical electric field.

Discussion of the Related Art

Various input devices, such as a keyboard, a mouse, a trackball, a joystick, a digitizer, and the like, are used to configure an interface between a user and home appliances or various information communication devices. However, the use of the above input devices requires the user to learn how to use them and involves inconvenience like the space occupied by them. Accordingly, there is a growing demand for input devices which are easy and simple to use and can reduce malfunctions. In response to this demand, a touch sensor was proposed to enable the user to directly touch the screen with he/her finger or a pen to input information.

The touch sensor is simple to use, has less malfunctions, and enables the user to input without using an additional input device. In addition, the touch sensor can be applied to various display devices because it enables the user to operate it quickly and easily through content displayed on the screen.

The touch sensor used for display devices can be classified into add-on type, on-cell type, and integrated type (or in-cell type) according to its structure. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device. In the integrated type, touch sensor elements are integrated into a display device to make the display device thin and improve the durability of the display device.

Among them, the integrated type touch sensor is relatively widely used because it reduces thickness by using common electrodes of the display device as touch electrodes and also improves durability by forming touch elements inside the display device.

A typical display device to which the integrated type touch sensor is applied is a liquid crystal display device. The liquid crystal display device generally comprises a liquid crystal display panel with a thin film transistor array and a color filter array disposed to face each other with a liquid crystal layer interposed between them.

Such liquid crystal display devices are classified into a vertical electric field type and a horizontal electric field type depending on where a common electrode and a pixel electrode are formed with respect to the liquid crystal layer. In the vertical electric field type, the common electrode and the pixel electrode are disposed to face each other with the liquid crystal layer interposed between them and driven to apply a vertical electric field to the liquid crystals, and in the horizontal electric field type, the common electrode and the pixel electrode are arranged at one side of the liquid crystal layer and driven to apply a horizontal electric field to the liquid crystals. The vertical electric field type comprises a TN (Twisted Nematic) mode type and a VA (Vertical Alignment) mode type, the horizontal electric field type comprises an IPS (In Plane Switching) mode type and an FFS (Fringe Field Switching) mode type.

In a related art horizontal electric field type touch sensor-integrated liquid crystal display device, both a common electrode and a pixel electrode are formed on a transparent substrate (i.e., lower transparent substrate) of a thin film transistor array to apply a horizontal electric field to the liquid crystals and drive the liquid crystals, the common electrode is segmented into touch electrodes also serving as common electrodes, and a display operation and a touch operation are performed in a time division manner. Each of the segments of the common electrode may serve either a touch driving electrode or a touch sensing electrode, or may be used as a touch driving and sensing electrode.

An example of the horizontal electric field type touch sensor-integrated liquid crystal display device will be described briefly with reference to FIG. 1.

FIG. 1 is a schematic cross-sectional view for explaining the operating principle of a related art horizontal electric field type touch sensor-integrated liquid crystal display device.

Referring to FIG. 1, a thin film transistor array TFTA includes a pixel electrode Px and a common electrode COM that form a horizontal electric filed on a liquid crystal layer LC by a pixel electrode Px and a common electrode COM formed on another layer. The common electrode COM also functions as a touch sensor, and is segmented into a plurality of touch driving electrodes Tx and a plurality of touch sensing electrodes Rx.

A color filter array CFA is arranged on the thin film transistor array TFTA, with a liquid crystal layer LC interposed between them, and window glass W is arranged on the color filter array CFA.

As shown in FIG. 1, the liquid crystals of the liquid crystal layer LC are driven by an electric field formed between the pixel electrode Px and the common electrode COM, and the capacitance between the touch driving electrodes Tx and the touch sensing electrodes Rx changes by touching the window glass W above the color filter array CFA with a finger F. Therefore, a touch and a touch position can be detected by performing a display operation and a touch operation in a time division manner.

However, the above-described related art horizontal electric field type touch sensor-integrated liquid crystal display device has the problem that a common electrode is formed on a thin film transistor array TFTA and is therefore not applicable to a vertical electric field type touch sensor-integrated liquid crystal display device.

Accordingly, there arises the need for a vertical electric field type touch sensor-integrated liquid crystal display device which is applicable to a vertical electric field type liquid crystal display device.

By the way, segmenting a common electrode of the vertical electric field type liquid crystal display device and using the segments of the common electrode as touch electrodes involves the following problems.

First, when segmenting a common electrode formed on the color filter array CFA and using the segments of the common electrode as common electrodes for the display operation and touch electrodes for the touch operation, a low-resistance metal line needs to be connected to each of the segments (i.e., touch electrodes) of the common electrode in order to supply a common voltage or a touch driving voltage. The metal line connected to each of the segments of the common electrode needs to extend from a display area (active area) to a non-display area (bezel area) outside the display area. Accordingly, any overlap between the metal line and color filters lowers aperture ratio and display quality.

Second, since horizontal electric field type liquid crystal display device is configured in such a way that the segments of the common electrode and metal lines connected to the segments are formed in the thin film transistor array, there was no particular problem with connecting a source driver IC (integrated chip) for the display operation to a touch IC for the touch operation. On the other hand, the vertical electric field type liquid crystal display device is configured in such a way that the segments of the common electrode and metal lines connected to the segments are formed in the color filter array and a source driver IC (integrated chip) for the display operation and a touch IC for the touch operation are formed in the thin film transistor array. As the color filter array and the thin film transistor array are disposed to face each other with the liquid crystal layer interposed between them, it was difficult to connect the metal line formed in the color filter array to the source driver IC and touch IC formed on the thin film transistor array.

SUMMARY OF THE INVENTION

Accordingly, the present invention is directed to a touch sensor-integrated display device that substantially obviates one or more of the problems due to limitations and disadvantages of the related art.

An object of the present invention is to provide a vertical field type touch sensor-integrated display device which prevents a reduction in aperture ratio caused by metal lines connected to common electrodes (touch electrodes) in a vertical electric field type touch sensor-integrated liquid crystal display device.

Another object of the present invention is to provide a vertical field type touch sensor-integrated display device which allows metal lines formed in a color filter array to be easily connected to a thin film transistor array in a vertical electric field type touch sensor-integrated liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a touch sensor-integrated display device, having an active area and a bezel area disposed outside the active area, comprises a first substrate; a second substrate disposed to face the first substrate, with a liquid crystal layer interposed therebetween; a plurality of color filters that are defined by a black matrix in the active area of the second substrate and arranged in a first direction and a second direction crossing the first direction; a plurality of touch electrodes also serving as common electrodes that are arranged in the first and second directions so as to overlap the plurality of color filters; and a plurality of routing wires that are arranged on the black matrix and are respectively connected to the touch electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
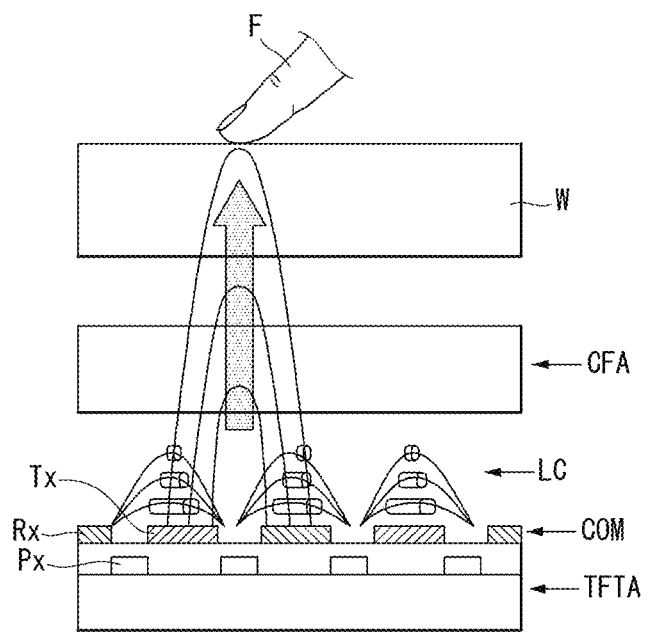
FIG. 1 is a schematic cross-sectional view for explaining the operating principle of a related art horizontal electric field type touch sensor-integrated liquid crystal display device.

Hereinafter, a vertical electric field type touch sensor-integrated liquid crystal display device according to an exemplary embodiment of the present invention will be described in detail with reference to the accompanying drawings. Throughout the specification, the same reference numerals indicate the same components.

Figure 2:
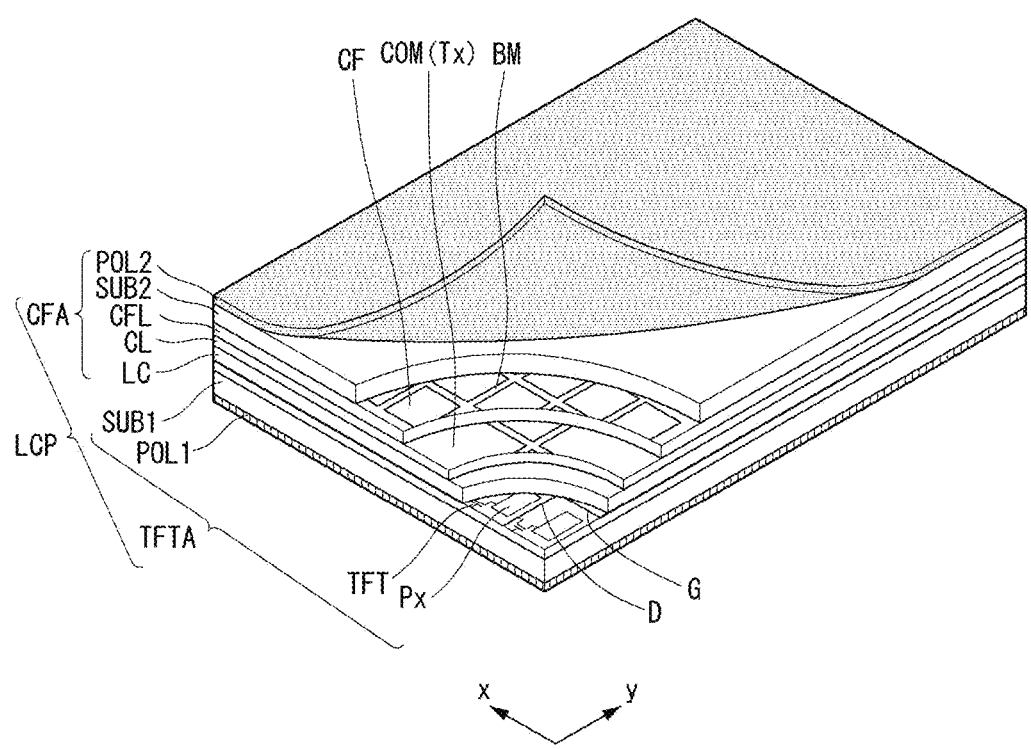
FIG. 2 is a partial exploded perspective view schematically showing a touch sensor-integrated display device according to an exemplary embodiment of the present invention.

First of all, a touch sensor-integrated display device according to an exemplary embodiment of the present invention will be described with reference to FIG. 2. FIG. 2 is a partial exploded perspective view schematically showing a touch sensor-integrated display device according to an exemplary embodiment of the present invention.

Referring to FIG. 2, the touch sensor-integrated display device according to the exemplary embodiment of the present invention includes a liquid crystal display panel LCP having a thin film transistor array TFTA and a color filter array CFA which are disposed with a liquid crystal layer interposed between them.

The thin film transistor array TFTA includes a plurality of gate line SG arranged side by side on a first substrate SUB1 in a first direction (e.g., x direction), a plurality of data lines D arranged side by side in a second direction (e.g., y direction) so as to cross over the gate lines, thin film transistors TFTs disposed at the crossings of the gate lines G and the data lines D, and a plurality of pixel electrodes Px for charging liquid crystal cells with a data voltage.

The color filter array CFA includes a color filter array CFL disposed on the second substrate SUB2 and consisting of a black matrix BM and color filters CF. The color filters include red (R) color filters, green (G) color filters, and blue (B) color filters, and are defined by the black matrix BM so as to prevent the colors of neighboring color filters being mixed together. The color filter array CFA further includes a common electrode layer CL comprising a plurality of segmented common electrodes COM, i.e., a plurality of touch electrodes Tx.

Polarizers POL1 and POL2 are respectively attached to the outer surfaces of the first and second substrates SUB1 and SUB2 of the liquid crystal display panel LCP, and an alignment film (not shown) for setting a pre-tilt angle of the liquid crystals is disposed on the inner surfaces of the first and second substrates SUB1 and SUB2 contacting the liquid crystals. A column spacer for maintaining a cell gap of liquid crystal cells is disposed between the color filter array CFA and thin film transistor array TFTA of the liquid crystal display panel LCP.

Next, the configuration of a touch sensor-integrated display device according to an exemplary embodiment of the present invention will be described more concretely with reference to FIGS. 3 to 6.

Figure 3:
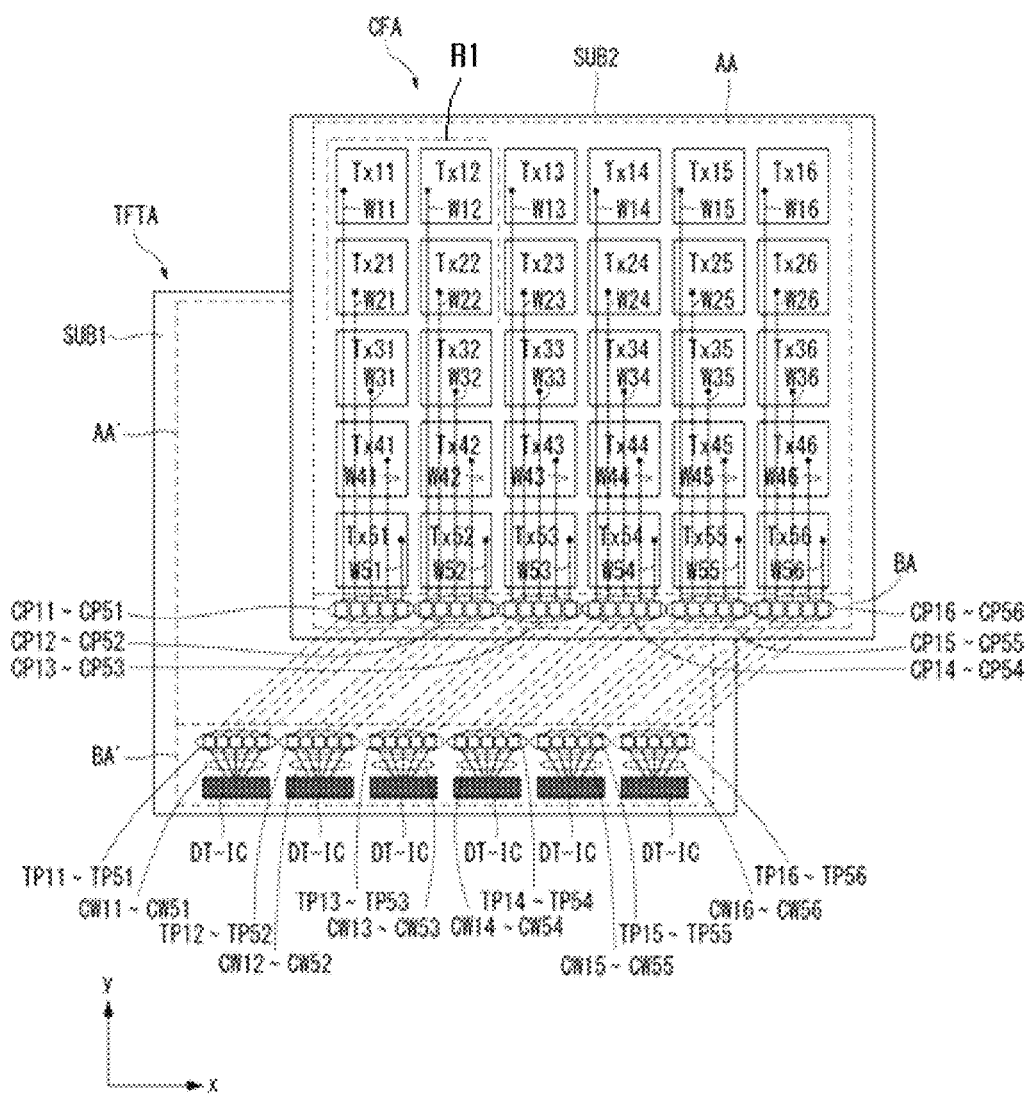
FIG. 3 is a top plan view illustrating a color filter array and thin film transistor array of a touch sensor-integrated display device according to an exemplary embodiment of the present invention.
Figure 4:
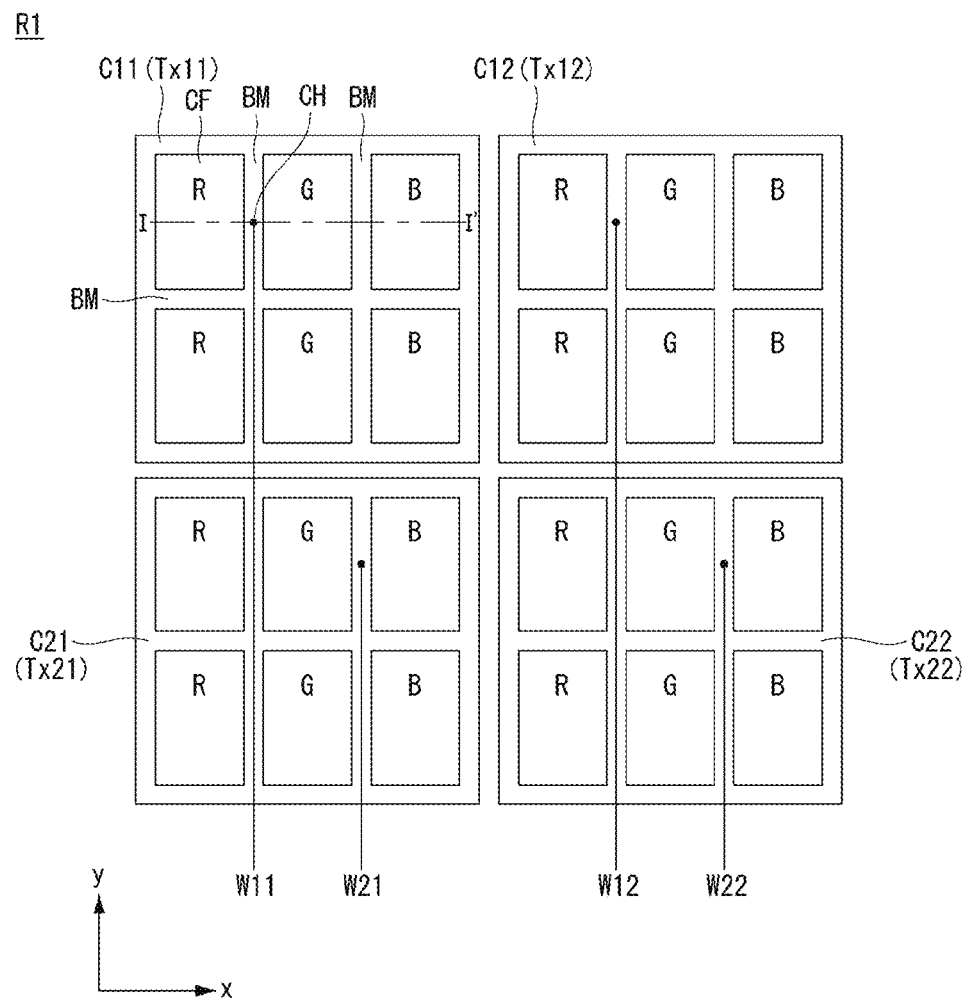
FIG. 4 is a top plan view illustrating the relationship between touch electrodes also serving as common electrodes and R, G, and B color filters in the region R1 shown in FIG. 3.
Figure 5A:
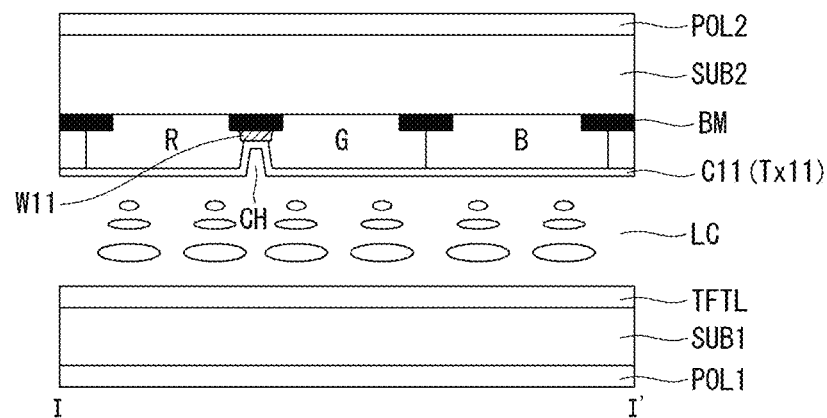
FIG. 5a is a cross-sectional view illustrating one example taken along the line I-I' of FIG. 4.
Figure 5B:
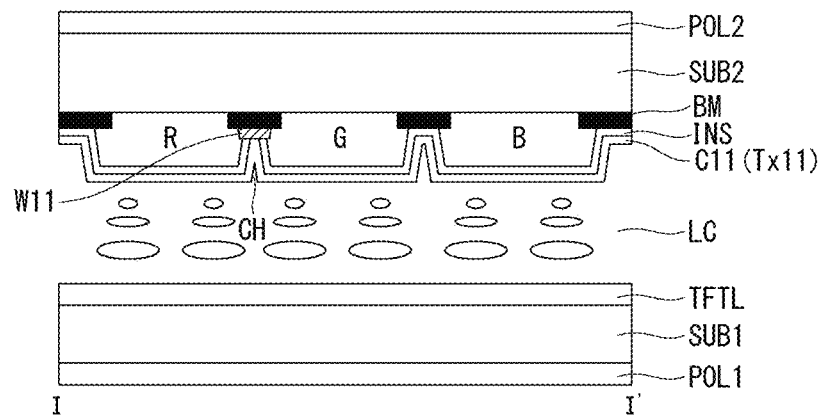
FIG. 5b is a cross-sectional view illustrating another example taken along the line I-I' of FIG. 4.
Figure 6:
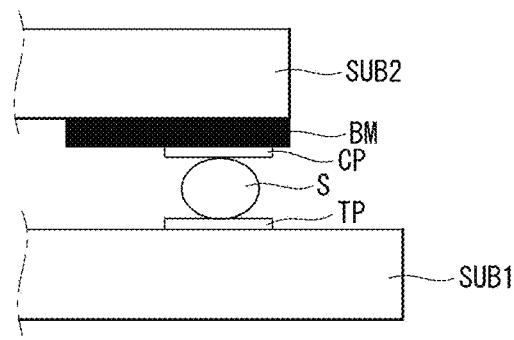
FIG. 6 is a cross-sectional view illustrating a junction between first and second pads of FIG. 3.

FIG. 3 is a top plan view schematically illustrating a color filter array and thin film transistor array of a touch sensor-integrated display device according to an exemplary embodiment of the present invention. FIG. 4 is a top plan view schematically illustrating the relationship between touch electrodes also serving as common electrodes and R, G, and B color filters in the region R1 shown in FIG. 3. FIG. 5a is a cross-sectional view illustrating one example taken along the line I-I' of FIG. 4. FIG. 5b is a cross-sectional view illustrating another example taken along the line I-I' of FIG. 4. FIG. 6 is a cross-sectional view illustrating a junction between first and second pads of FIG. 3.

Referring to FIGS. 3 and 4, the touch sensor-integrated display device according to the exemplary embodiment of the present invention includes a thin film transistor TFTA and a color filter array CFA.

The thin film transistor array TFTA includes an active area AA' and a bezel area BA'. As shown in FIG. 2, the active area AA' of the thin film transistor array TFTA includes a plurality of gate lines G, a plurality of data lines D, thin film transistors TFT, and a plurality of pixel electrodes Px for charging liquid crystal cells with a data voltage.

The bezel area BA' of the thin film transistor array TFTA is disposed outside the active area AA, and includes a plurality of first pads TP11 to TP51, TP12 to TP52, TP13 to TP53, TP14 to TP54, TP15 to TP55, and TP16 to TP56 which are disposed in the bezel area BA of the color filter array CFA when attached to the color filter array CFA. Furthermore, the bezel area BA' of the thin film transistor array TFTA includes a plurality of data driving and touch ICs DT IC arranged on one end thereof and connecting wires CW11 to CW51, CW12 to CW52, CW13 to CW53, CW14 to CW54, CW15 to CW55, and CW16 to CW56 for connecting the first pads TP11 to TP51, TP12 to TP52, TP13 to TP53, TP14 to TP54, TP15 to TP55, and TP16 to TP56 and the data driving and touch ICs DT IC.

The color filter array CFA includes an active area AA and a bezel area BA. The active area AA is a data display area where touch electrodes also serving as common electrodes are disposed. The bezel area BA is disposed outside the active area AA. A plurality of routing wires W11 to W51, W12 to W51, W13 to W53, W14 to W54, W15 to W55, and W16 to W56 and second pads CP11 to CP51, CP12 to CP52, CP13 to CP53, CP14 to CP54, CP15 to CP55, and CP16 to CP56, which are connected and extend to a plurality of touch electrodes Tx11 to Tx51, Tx12 to Tx51, Tx13 to Tx53, Tx14 to Tx54, Tx15 to Tx55, and Tx16 to Tx56 also serving as common electrodes, are disposed in the bezel area BA.

The active area AA of the color filter array CFA includes a color filter layer CL disposed on the second substrate SUB2 and having R, G, and B color filters CF, the R, G, and B color filters being defined by the black matrix BM and configured to prevent the colors of neighboring color filters being mixed together. Furthermore, the active area AA includes the touch electrodes Tx11 to Tx51, Tx12 to Tx52, Tx13 to Tx53, Tx14 to TX54, Tx15 to Tx55, and Tx16 to Tx56 also serving as common electrodes divided in a first direction (e.g., x-axis direction) and a second direction (e.g., y-axis direction) crossing over each other, and the routing wires W11 to W51, W12 to W52, W13 to W53, W14 to W54, W15 to W55, and W16 to W56 which are respectively connected to the touch electrodes Tx11 to Tx51, Tx12 to Tx52, Tx13 to Tx53, Tx14 to TX54, Tx15 to Tx55, and Tx16 to Tx56 also serving as common electrodes and arranged side by side in the second direction. The size of each of the touch electrodes Tx11 to Tx51, Tx12 to Tx52, Tx13 to Tx53, Tx14 to TX54, Tx15 to Tx55, and Tx16 to Tx56 corresponds to a plurality of color filters CF.

The touch electrodes Tx11 to Tx51, Tx12 to Tx52, Tx13 to Tx53, Tx14 to TX54, Tx15 to Tx55, and Tx16 to Tx56 also serving as common electrodes disposed in the active area AA of the color filter array operate as common electrodes in a display operation for displaying data and as touch electrodes in a touch operation for detecting a touch position.

The bezel area BA of the color filter array CFA is disposed outside the active area AA, and includes the routing wires W11 to W51, W12 to W52, W13 to W53, W14 to W54, W15 to W55, and W16 to W56 which are respectively connected to the touch electrodes Tx11 to Tx51, Tx12 to Tx52, Tx13 to Tx53, Tx14 to Tx54, Tx15 to Tx55, and Tx16 to Tx56 also serving as common electrodes and extend from the active area AA. Furthermore, the bezel area BA of the color filter array CFA includes the second pads CP11 to CP51, CP12 to CP52, CP13 to CP53, CP14 to CP54, CP15 to CP55, and CP16 to CP56 which are disposed at one edge, respectively connected to the routing wires W11 to W51, W12 to W52, W13 to W53, W14 to W54, W15 to W55, and W16 to W56 and correspond in position to the first pads TP11 to TP51, TP12 to TP52, TP13 to TP53, TP14 to TP54, TP15 to TP55, and TP16 to TP56.

Referring to FIGS. 4 and 5A, a color filter layer is disposed on one surface of the second substrate SUB2, and includes red color filters (R), green color filters (G), and blue color filters (B) defined by the black matrix BM so as to prevent the colors of neighboring color filters being mixed together. The routing wires W11 to W51, W12 to W52, W13 to W53, W14 to W54, W15 to W55, and W16 to W56 are disposed in some parts of the black matrix BM in such a way that they are arranged in the second direction (e.g., y-axis direction). Although the color filter layer R, G, and B is originally disposed to cover the routing wires W11 to W51, W12 to W52, W13 to W53, W14 to W54, W15 to W55, and W16 to W56, contact holes CH exposing part of each of the routing wires W11 to W51, W12 to W52, W13 to W53, W14 to W54, W15 to W55, and W16 to W56 are disposed in the color filter layer R, G, and B at contact points between the touch electrodes Tx11 to Tx51, Tx12 to Tx52, Tx13 to Tx53, Tx14 to Tx54, Tx15 to Tx55, and Tx16 to Tx56 also serving as common electrodes and the routing wires W11 to W51, W12 to W52, W13 to W53, W14 to W54, W15 to W55, and W16 to W56, which will be described later.

The touch electrodes Tx11 to Tx51, Tx12 to Tx52, Tx13 to Tx53, Tx14 to Tx54, Tx15 to Tx55, and Tx16 to Tx56 also serving as common electrodes are disposed on the color filter layer R, G, and B with the contact holes CH. The touch electrodes Tx11 to Tx51, Tx12 to Tx52, Tx13 to Tx53, Tx14 to Tx54, Tx15 to Tx55, and Tx16 to Tx56 also serving as common electrodes are respectively connected to the routing wires W11 to W51, W12 to W52, W13 to W53, W14 to W54, W15 to W55, and W16 to W56 exposed via the contact holes CH.

Referring to FIGS. 4 and 5B, red color filters (R), green color filters (G), and blue color filters (B) are disposed on one surface of the second substrate SUB2, and defined by the black matrix BM so as to prevent the colors of neighboring color filters being mixed together. The color filters R, G, and B are disposed so as to expose at least part of the black matrix BM located between them.

As shown in FIGS. 4 and 5B, the routing wires W11 to W51, W12 to W52, W13 to W53, W14 to W54, W15 to W55, and W16 to W56 are disposed in some parts of the black matrix BM defining neighboring color filters R, G, and B in such a way that they are arranged in the second direction along the first direction (x-axis direction). An insulation layer INS is located on the second substrate SUB2 with the black matrix BM, the color filters R, G, and B, and the routing wires W11 to W51, W12 to W52, W13 to W53, W14 to W54, W15 to W55, and W16 to W56 so as to cover them. The insulation layer INS has contact holes CH exposing part of each of the routing wires W11 to W51, W12 to W52, W13 to W53, W14 to W54, W15 to W55, and W16 to W56.

The touch electrodes Tx11 to Tx51, Tx12 to Tx52, Tx13 to Tx53, Tx14 to Tx54, Tx15 to Tx55, and Tx16 to Tx56 also serving as common electrodes are disposed on the insulation layer INS with the contact holes CH. The touch electrodes Tx11 to Tx51, Tx12 to Tx52, Tx13 to Tx53, Tx14 to Tx54, Tx15 to Tx55, and Tx16 to Tx56 also serving as common electrodes are respectively connected to the routing wires W11 to W51, W12 to W52, W13 to W53, W14 to W54, W15 to W55, and W16 to W56 exposed via the contact holes CH.

The size of each of the touch electrodes Tx11 to Tx51, Tx12 to Tx52, Tx13 to Tx53, Tx14 to Tx54, Tx15 to Tx55, and Tx16 to Tx56 also serving as common electrodes corresponds to several or several tens of color filters. Although FIGS. 3 and 4 illustrates one touch electrode also serving as a common electrode as corresponding to 6 color filters, this is merely an example and the sizes of the touch electrodes and color filters can be adjusted according to desired touch accuracy or the display device's resolution.

According to the touch sensor-integrated display device having the above-described configuration, the routing wires W11 to W51, W12 to W52, W13 to W53, W14 to W54, W15 to W55, and W16 to W56 made of metal material are disposed on the black matrix BM and respectively connected to the touch electrodes Tx11 to Tx51, Tx12 to Tx52, Tx13 to Tx53, Tx14 to Tx54, Tx15 to Tx55, and Tx16 to Tx56 also serving as common electrodes. Since the routing wires W11 to W51, W12 to W52, W13 to W53, W14 to W54, W15 to W55, and W16 to W56 are covered by the black matrix BM, the routing wires made of metal material do not cause a reduction in aperture ratio, thus making it easy to realize the vertical electric field type touch-sensor integrated display device.

Next, junctions between the first pads TP11 to TP51, TP12 to TP52, TP13 to TP53, TP14 to TP54, TP15 to TP55, and TP16 to TP56 and the second pads CP11 to CP51, CP12 to CP51, CP13 to CP53, CP14 to CP54, CP15 to CP55, and CP16 to CP56 will be described with reference to FIG. 6.

Referring to FIG. 6, the second pads CP11 to CP51, CP12 to CP51, CP13 to CP53, CP14 to CP54, CP15 to CP55, and CP16 to CP56 are disposed on the black matrix BM on the second substrate SUB2. The first pads TP11 to TP51, TP12 to TP52, TP13 to TP53, TP14 to TP54, TP15 to TP55, and TP16 to TP56 are disposed on the first substrate SUB1. The first pads TP11 to TP51, TP12 to TP52, TP13 to TP53, TP14 to TP54, TP15 to TP55, and TP16 to TP56 and the second pads CP11 to CP51, CP12 to CP51, CP13 to CP53, CP14 to CP54, CP15 to CP55, and CP16 to CP56 are disposed to face each other, with a sealant S containing a conductive material such as an Au ball, interposed between them to seal off the first substrate SUB1 and the second substrate SUB2 and at the same time electrically connect the first pads TP11 to TP51, TP12 to TP52, TP13 to TP53, TP14 to TP54, TP15 to TP55, and TP16 to TP56 and the second pads CP11 to CP51, CP12 to CP51, CP13 to CP53, CP14 to CP54, CP15 to CP55, and CP16 to CP56.

According to the above-described configuration, the routing wires W11 to W51, W12 to W52, W13 to W53, W14 to W54, W15 to W55, and W16 to W56 made of metal material and disposed in the color filter array CFA can be easily connected to the data driving and touch ICs DT IC arranged in the thin film transistor array TFTA, through the first pads TP11 to TP51, TP12 to TP52, TP13 to TP53, TP14 to TP54, TP15 to TP55, and TP16 to TP56, the sealant S, and the second pads CP11 to CP51, CP12 to CP51, CP13 to CP53, CP14 to CP54, CP15 to CP55, and CP16 to CP56, thereby making it easy to realize the vertical electric field type touch sensor-integrated display device.

According to the touch sensor-integrated display device of the present invention, routing wires made of metal material respectively connected to touch electrodes also serving as common electrodes are disposed on a black matrix. Since the routing wires are covered by the black matrix, the routing wires made of metal material do not cause a reduction in aperture ratio, thus making it easy to realize the vertical electric field type touch-sensor integrated display device.

Moreover, the routing wires made of metal material and disposed in the color filter array can be easily connected to the data driving and touch ICs arranged in the thin film transistor array, through the first pads, the sealant, and the second pads, thereby making it easy to realize the vertical electric field type touch sensor-integrated display device.

It will be apparent to those skilled in the art that various modifications and variations can be made in the touch-sensor integrated display device of the present invention without departing from the spirit or scope of the invention. Thus, it is intended that the present invention cover the modifications and variations of this invention provided they come within the scope of the appended claims and their equivalents.

What is claimed is:
1. A touch sensor-integrated display device having an active area and a bezel area disposed outside the active area, the touch sensor-integrated display device comprising:
 a first substrate;
 a second substrate disposed to face the first substrate;
 a liquid crystal layer interposed between the first and second substrates;
 a color filter layer including a plurality of color filters at respective openings defined by a black matrix in the active area of the second substrate, the plurality of color filters arranged in a first direction and a second direction crossing the first direction;

a plurality of touch electrodes also serving as common electrodes divided in the first and second directions crossing over each other so as to overlap the plurality of color filters; and a plurality of routing wires that are arranged in the active area to be on the black matrix between adjacent ones of the color filters, are connected in the active area to respective ones of the touch electrodes such that each routing wire is between the respective one of the touch electrodes connected thereto and the black matrix and such that each routing wire overlaps the black matrix, and are extended to the bezel area, wherein the color filter layer covers the black matrix and the routing wires and has a plurality of contact holes exposing a portion of each of the routing wires.

2. The touch sensor-integrated display device of claim 1, wherein a size of each of the plurality of the touch electrodes corresponds to at least two color filters.

3. The touch sensor-integrated display device of claim 1, further comprising an insulation layer that covers the color filters, the black matrix, and the routing wires and has a plurality of contact holes exposing a portion of each of the routing wires.

4. The touch sensor-integrated display device of claim 1, wherein the plurality of touch electrodes are respectively connected to the routing wires via the contact holes.

5. The touch sensor-integrated display device of claim 1, wherein the routing wires are arranged side by side only in either one of the first and second directions.

6. The touch sensor-integrated display device of claim 1, wherein the touch sensor-integrated display device further comprises:

a plurality of first pads disposed in the bezel area of the first substrate;

data driving and touch ICs connected to the first pads; and a plurality of second pads that are disposed in the bezel area of the second substrate so as to correspond to the first pads and respectively connected to the routing wires.

7. The touch sensor-integrated display device of claim 6, further comprising a sealant that is disposed between the first pads and the second pads and containing a conductive material.

8. The touch sensor-integrated display device of claim 1, wherein the routing wires are made of metal.

9. The touch sensor-integrated display device of claim 1, wherein more than one of the plurality of touch electrodes are arranged in a same one of the first and second directions to be between adjacent ones of the touch electrodes.

10. The touch sensor-integrated display device of claim 9, wherein the more than one of the plurality of touch electrodes are provided side by side between the adjacent ones of the touch electrodes.

11. The touch sensor-integrated display device of claim 1, wherein the active area is rectangular and the touch electrodes are extended to a portion of the bezel area outside a same side of the active area.

12. The touch sensor-integrated display device of claim 1, wherein the plurality of the touch electrodes are arranged in one layer with a first plurality in the first direction and a second plurality in the second direction.

13. The touch sensor-integrated display device of claim 1, wherein the touch electrodes are over the opening defined by the black matrix.

* * * * *